(12) United States Patent
Rosemeier et al.

(10) Patent No.: US 8,419,579 B2
(45) Date of Patent: Apr. 16, 2013

(54) TRANSMISSION DEVICE

(75) Inventors: Thomas Rosemeier, Meckenbeuren (DE); Bernd-Robert Hohn, Munich (DE); Christoph Pelchen, Tettnang (DE)

(73) Assignee: ZF Friedrichshafen AG, Friedrichshafen (DE)

(*) Notice: Subject to any disclaimer, the term of this patent is extended or adjusted under 35 U.S.C. 154(b) by 424 days.

(21) Appl. No.: 12/808,508

(22) PCT Filed: Dec. 8, 2008

(86) PCT No.: PCT/EP2008/066978
§ 371 (c)(1),
(2), (4) Date: Jun. 16, 2010

(87) PCT Pub. No.: WO2009/080473
PCT Pub. Date: Jul. 2, 2009

(65) Prior Publication Data
US 2010/0323837 A1    Dec. 23, 2010

(30) Foreign Application Priority Data
Dec. 20, 2007  (DE) .................. 10 2007 055 881

(51) Int. Cl.
*F16H 48/06*  (2006.01)
*F16H 48/30*  (2012.01)
*F16H 37/08*  (2006.01)

(52) U.S. Cl.
USPC .......................................... 475/150; 475/339

(58) Field of Classification Search .................. 475/150, 475/339
See application file for complete search history.

(56) References Cited

U.S. PATENT DOCUMENTS

| | | | |
|---|---|---|---|
| 5,437,583 A | 8/1995 | Shibahata et al. | |
| 6,098,737 A | 8/2000 | Aoki | |
| 6,527,671 B2 * | 3/2003 | Paalasmaa et al. | ............. 477/99 |
| 7,156,766 B2 | 1/2007 | Gassmann | |
| 7,491,146 B2 | 2/2009 | Sharma et al. | |
| 7,588,511 B2 * | 9/2009 | Tangl et al. | ................... 475/150 |
| 7,651,426 B2 | 1/2010 | Yokoyama et al. | |
| 8,182,386 B2 * | 5/2012 | Rosemeier et al. | ........... 475/150 |

(Continued)

FOREIGN PATENT DOCUMENTS

DE    44 08 587 A1    10/1994
DE    103 29 770 A1    2/2005

(Continued)

*Primary Examiner* — Justin Holmes
*Assistant Examiner* — Jacob S Scott
(74) *Attorney, Agent, or Firm* — Davis & Bujold, PLLC

(57) ABSTRACT

A transmission device, for a motor vehicle, with at least two drive output shafts and two multi-shaft planetary gearsets in active connection with one another. A shaft of a planetary gearset is actively connected with an output shaft and is shifted, between first and second power paths, such that in the first power path, torque of an electric machine is transmitted in equal parts and with the same sign to the output shafts, and in the second power path, torque is transmitted in equal parts but with different signs. One of the two planetary gearsets is made as a four-shaft, reduced coupling transmission with two sun gears and a common planetary gear carrier with radially inner and outer planetary gears that mesh with one another, and which are engaged, on the one hand, with the sun gears and, on the other hand, with a rotationally fixed ring gear.

8 Claims, 3 Drawing Sheets

U.S. PATENT DOCUMENTS

2007/0249456 A1    10/2007  Meixner
2010/0167862 A1*    7/2010  Hoehn ................... 475/150
2010/0323838 A1*  12/2010  Rosemeier et al. ........ 475/150

FOREIGN PATENT DOCUMENTS

| DE | 10 2005 021 023 A1 | 11/2006 |
| DE | 10 2006 022 175 A1 | 11/2007 |
| DE | 10 2006 031 089 A1 | 1/2008 |
| EP | 0 224 144 A1 | 6/1987 |
| EP | 1 787 846 A1 | 5/2007 |
| WO | 2005/110790 A2 | 11/2005 |
| WO | 2007/002743 A2 | 1/2007 |

* cited by examiner

TRANSMISSION DEVICE

This application is a National Stage completion of PCT/EP2008/066978 filed Dec. 8, 2008, which claims priority from German patent application serial no. 10 2007 055 881.5 filed Dec. 20, 2007.

FIELD OF THE INVENTION

The invention concerns a transmission device.

BACKGROUND OF THE INVENTION

A transmission device of this type is shown for example from DE 10 2006 031 089.6, in which, to drive an axle of a motor vehicle, by means of an electric machine and a shifting device (clutch) either a drive mode with an equal drive torque on the driven wheels or a torque-vectoring mode with different drive torques can be implemented. For this, two planetary gearsets in active connection with one another and with a clutch between them are provided. To implement these two driving modes, in the two planetary gearsets two or three tooth engagement levels next to one another as viewed in the axial direction are required.

SUMMARY OF THE INVENTION

The purpose of the present invention is to propose a transmission device of the type considered, which, with a smaller number of tooth engagements levels or a better efficiency, offers a concept which is improved still more in structural and design terms.

According to the invention, it is proposed that one of the two planetary gearsets is made as a four-shaft, reduced coupled transmission with two sun gears arranged axially next to one another, a common planetary gear carrier with radially inner and radially outer planetary gears that mesh with one another and which engage on the one hand with the sun gears having different numbers of teeth and on the other hand with a non-rotating ring gear. Such a transmission device with a reduced coupling transmission can be used where in situations of restricted structural space, two numerically equal transmission ratios with different signs are required. The coaxial design enables a structurally favorable layout which can be made without auxiliary shafts.

Preferably, it is also proposed that the transmission ratio of the coupling gearset is designed such that the rotational speed of the planetary carrier and at one of the sun gears is numerically the same but opposite, and at the other sun gear the speed is by comparison lower or higher. In this way, in one power path, transmission ratios for fast or slow driving can be produced, while in the other power path, drive torques with different signs can be actuated.

In a first advantageous design of the reduced coupling gearset at least one set of the planetary gears is made in a stepped manner, with different numbers of teeth. In particular the radially inner planetary gears that mesh with the sun gears can be made in steps, with different numbers of teeth, while the driving connection with the fixed ring gear is formed by radially outer planetary gears which mesh with only one step of the radially inner planetary gears. Besides simplifying the structure, this enables a greater degree of design freedom in the range of the transmission ratios of the coupling gearset.

Alternatively, at least the radially inner planetary gearsets can be made without steps, such that the different tooth numbers of the sun gears are obtained by profile displacements in the teeth. In the case of the closer transmission ratios of the range, this results in reduced production and construction effort for the coupling set.

A particularly preferred application of the above transmission device is considered to be on a drive axle of a motor vehicle which can be powered by an electric machine and which, by means of the shifting device, can be shifted to a drive mode (e.g. hybrid drive) as one of the power paths and to a torque-vectoring mode as the second power path.

BRIEF DESCRIPTION OF THE DRAWINGS

Below, an example embodiment of the invention is explained in more detail. The attached, schematic drawings show.

DETAILED DESCRIPTION OF THE PREFERRED EMBODIMENTS

Figure 1:
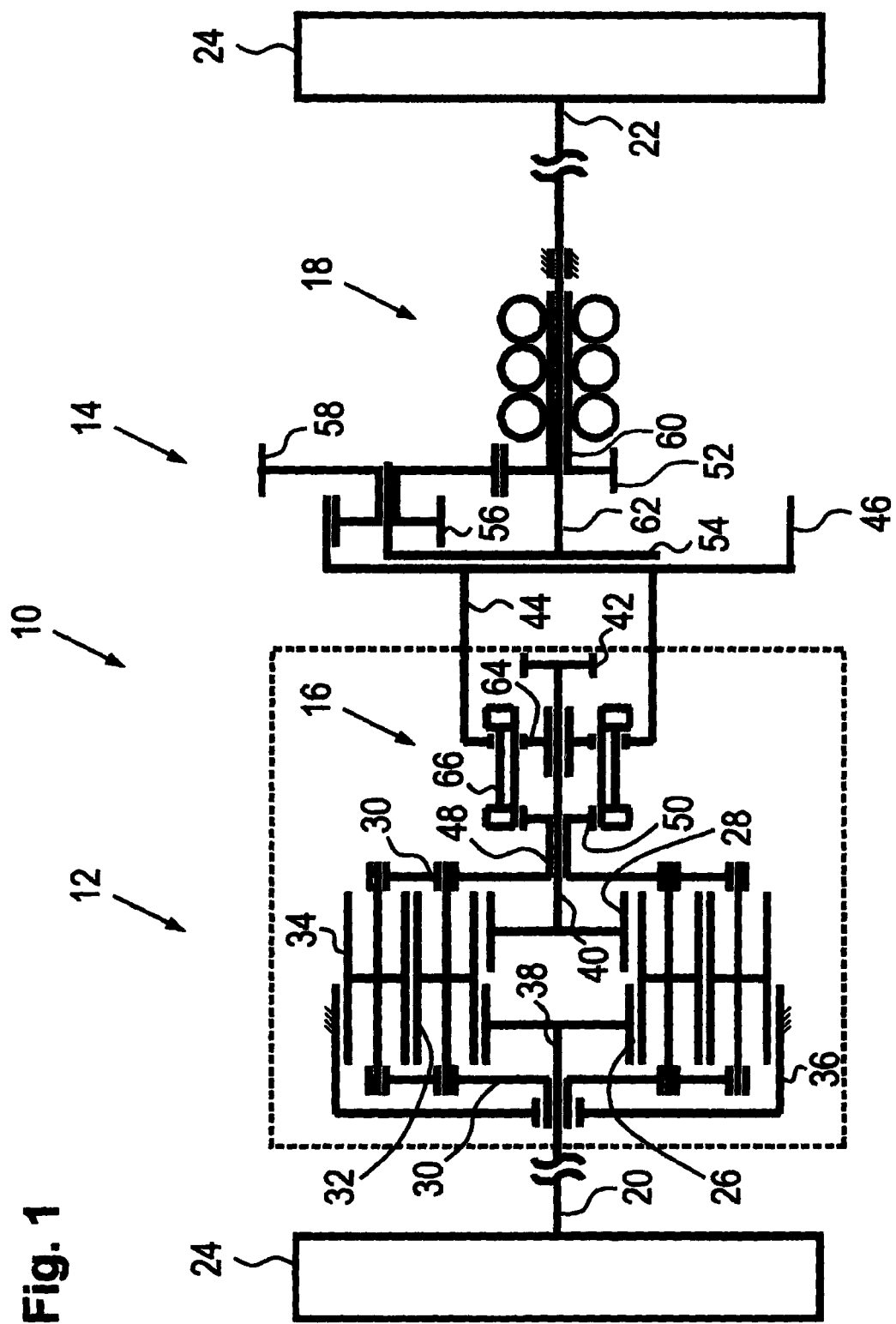
FIG. 1: A transmission for a motor vehicle axle that can be powered by an electric machine, comprising two planetary gearsets that can be shifted between by a shifting device, one of the planetary gearsets being designed as a reduced coupling gearset

FIG. 1 shows a schematic view in which a driven axle of a motor vehicle, for example a rear axle, is indexed 10, with a transmission device having two planetary gearsets 12, 14, a shifting device 16 between them, and a driving electric machine 18 that can be operated in both rotation directions.

The transmission device 12, 14 drives two output shafts 20, 22 on its output side, which are in driving connection with the wheels 24. The electric machine 18 is arranged coaxially with the output shaft 22.

The planetary gearsets 12, 14 in active connection with one another are designed as follows:

The planetary gearset 12 is made as a reduced coupling gearset with two sun gears 26, 28, a planetary gear carrier 30 with radially inner planetary gears 32 and radially outer planetary gears, and a ring gear 36.

The sun gears 26, 28 have different numbers of teeth and mesh with the radially inner planetary gears 32 that extend over both sun gears 26, 28, which have uniform gearing. This is made possible by a profile displacement of the teeth on the sun gears 26, 28. For a better characterization of these different tooth numbers the sun gear 28 with the smaller outer diameter (=smaller numbers of teeth) is shown. In fact, both sun gears 26, 28 mesh with the corresponding planetary gears 32.

Furthermore, the radially outer planetary gears 34 are engaged both with the inner planetary gears 32 and with the radially outer ring gear 36 via its corresponding inner teeth. The ring gear 36 is arranged fixed and also serves to support the torque within the coupling gearset 12.

The sun gear 26 is in driving connection with the drive output shaft 20 via a first output shaft 38. The second output shaft 40, which is connected to the sun gear 28, can be connected to the ring gear 46 of the planetary gearset 14 by a clutch gearwheel 42 of the shifting device 16 and a hollow shaft 44.

Furthermore, the planetary gear carrier 30 can also be coupled by the hollow shaft 44 to the ring gear 46 of the planetary gearset 14 via a hollow shaft 48 and a second clutch gearwheel 50.

Figure 2:
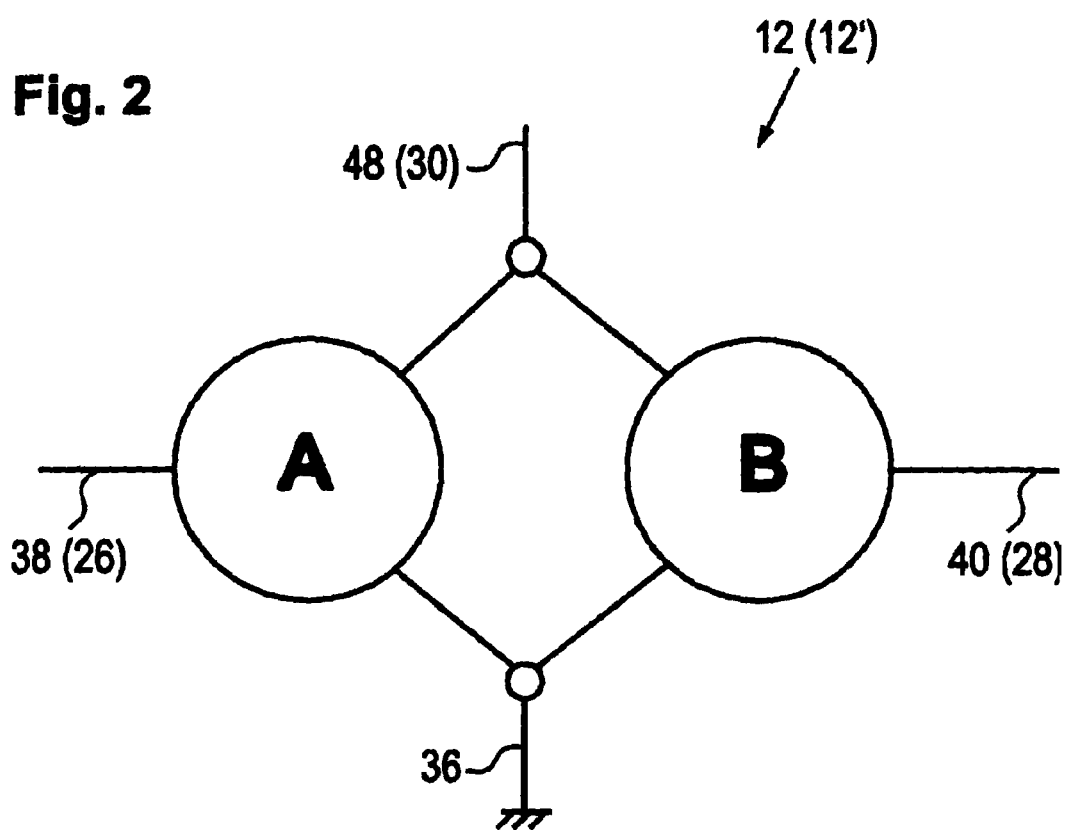
FIG. 2: Wolf-logic diagram of the coupling gearset according to FIG. 1, and FIG. 3: A design of the coupling gearset alternative to that of FIG. 1, with stepped planetary gears

Referring first to FIG. 2, it can be seen from the Wolf diagram that the four-shaft reduced coupling gearset 12 is, as it were, formed by two planetary gearsets A and B, with the first output shaft 38 or the sun gear 26, the second output shaft 40 with the sun gear 28, the hollow shaft 48 of the planetary gear carrier 30, and finally, with the fixed ring gear 36.

By virtue of the design of the planetary gearset A described, the driving link is formed by the sun gear 26, the planetary gear carrier 30 with the planetary gears 32, 34 and the fixed ring gear 36. The planetary gearset B with the sun gear 28 also uses the common ring gear 36 and the common planetary carrier 30 with the planetary gears 32, 34.

As can be seen from FIG. 1, the planetary gearset 14 comprises a sun gear 52, a planetary gear carrier 54 with stepped planetary gears 56, 58 and the ring gear 46.

The sun gear 52 is in driving connection with the drive input hollow shaft 60 of the electric machine 18 (only indicated) and meshes with the planetary gears 58, whereas the planetary gears 56 with a smaller number of teeth are engaged with the inner teeth of the ring gear 46. In turn, the planetary gear carrier 54 is connected to the drive output shaft 22 via an output shaft 62.

The shifting device 16 is formed by an axially movable shifting sleeve 66 having inner teeth and permanently connected by a coupling element 64 to the hollow shaft 44, which, from a neutral position, can be connected alternatively to the clutch gearwheels 42 or 50 and thus connects either the output shaft 40 and the sun gear 28, or the hollow shaft 48 and the planetary gear carrier 30, to the hollow shaft 44 and the ring gear 46 of the planetary gearset 14.

The shifting device 16 described can be, for example, a synchronous clutch known per se in shift transmissions. The necessary shifting actuation is not shown and can be obtained hydraulically or electromagnetically by means of corresponding control elements.

The transmission ratio of the coupling gearset 12 is designed such that the rotationa; speeds at the planetary gear carrier 30 and at the sun gear 28 (=planetary gearset A) are equal but opposite, while at the other sun gear 26 (=planetary gearset B), by comparison, the speed is lower.

In the shift position for electrically driving the axle 10 of the motor vehicle, the hollow shaft 44 of the planetary gearset 14 is connected to the hollow shaft 48 of the planetary gear carrier 30 of the coupling gearset 12. Correspondingly, and because of the transmission ratio design of the two planetary gearsets 12, 14 the power path runs, with the same sign, from the electric machine 18 via the planetary gear carrier 54 and the hollow output shaft 62 to one drive output shaft 22, and via the planetary gear carrier 30 and the sun gear 26 to the output shaft 38 and the other drive output shaft 20. The torque to be transferred is supported within the coupling gearset 12 on the ring gear 36 fixed to the housing.

In the torque-vectoring mode the ring gear 46 of the planetary gearset 14 is in driving connection with the output shaft 40 and sun gear 28 of the coupling gearset 12, so that now, by actuating the electric machine 18 as appropriately in both rotational directions and thanks to the transmission ratio design selected, torques of different signs can be produced. In other words, one drive output shaft 20 can be accelerated or braked compared with the other drive output shaft 22, in order to influence the driving stability of the motor vehicle, particularly when driving round curves.

The power path to the driven wheel 24 on the left in the drawing now passes essentially via the output shaft 40 with the sun gear 28 and via the radially inner planetary gears 32 to the sun gear 26 with the output shaft 38 and the drive output shaft 20, while the reaction torque is supported by the radially outer planetary gears 34 and the ring gear 36 fixed on the housing.

By virtue of the arrangement of the coupling gearset 12 a compact structure is achieved, with only two tooth engagement levels next to one another in the axial direction. Furthermore, from the first sun gear 26 to the second sun gear 28 there can be a positive transmission ratio and from the first sun gear 26 to the planetary gear carrier 30, as designed in this case, there can be a transmission ratio numerically equal but of opposite sign.

Figure 3:
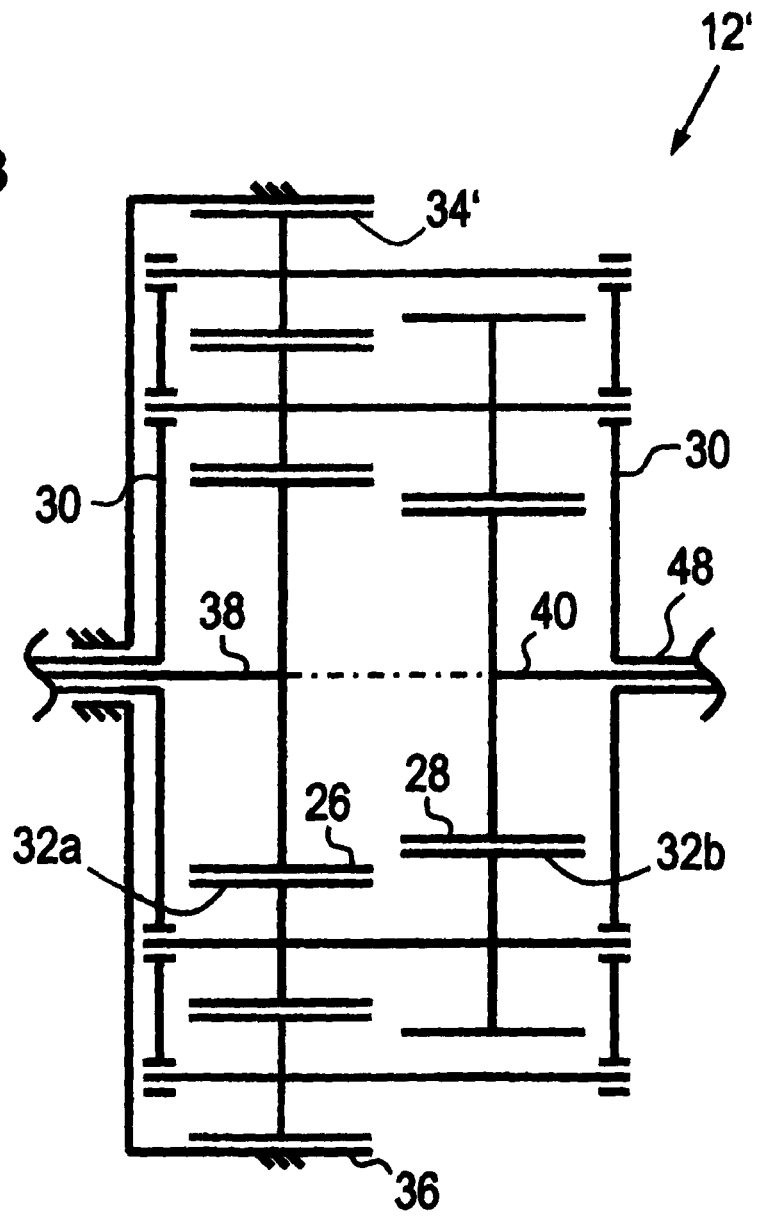

FIG. 3 shows an alternative design of the coupling gearset 12 according to FIGS. 1 and 2 of the transmission device which, however, is described only insofar as it differs essentially from the version according to FIG. 1. Components with the same function are given the same indexes.

Unlike those of FIG. 1, the radially inner planetary gears 32 of the coupling gearset 12 are stepped, with planetary gears 32a having a smaller number of teeth and planetary gears 32b having a larger number, in order thereby, in co-operation with the sun gears 26, 28 having different tooth numbers and different outer diameters, to produce the desired transmission ratios. By virtue of the associated greater design freedom, a profile displacement of the teeth on the sun gears 26, 28 is no longer necessary.

Furthermore, the radially outer planetary gears 34 are not formed to pass through between the planetary carrier 30 on which the planetary gears 32a, 32b, 34 are mounted, but rather, as can be seen, they engage only with the planetary gears 32a and with the radially outer ring gear 36.

Otherwise than in the transmission device according to FIG. 1, the shifting device 16 can also be arranged on the opposite side of the coupling gearset 12 and can be integrated in the output shaft 38, so that in kinematic reversal it connects either the sun gear 26 or the planetary gear carrier 30 to the output shaft 38 on the output side. The sun gear 28 can then be connected directly to the ring gear 46 of the second planetary gearset 14. This results in a particularly compact structure in the axial direction, with planetary gearsets 12, 14 positioned directly against one another.

Instead of the interlocking shifting device 16 described, a frictional clutch, for example a hydraulically controlled double-disk clutch, can also be used.

The invention claimed is:

1. A transmission device for a motor vehicle comprising:
at least two drive output shafts;
at least two multi-shaft planetary gearsets in active connection with one another such that a shaft of at least one of the two multi-shaft planetary gearsets being actively connectable with at least one of the two drive output shafts;
a shifting device, by which a shift is carried out between a first power path and a second power path, being provided between the two drive output shafts such that,
when the first power path is engaged, torque from an electric machine being transmitted in equal parts and with a same rotational direction to the two drive output shafts, and
when the second power path is engaged, the torque from the electric machine being transmitted with in opposite rotational directions to the two drive output shafts;
one of the two multi-shaft planetary gearsets (12, 14) is a four-shaft, reduced coupling transmission (12) with two sun gears (26, 28) arranged axially adjacent one another, a common planetary gear carrier (30) with radially inner and radially outer planetary gears (32, 34) that mesh with one another, and which are engaged with the two sun gears (26, 28) which have a different number of teeth, and with a non-rotationally arranged annular gear (36).

2. The transmission device according to claim 1, wherein a transmission ratio of a coupling gearset (12) is designed such that rotational speeds, at the common planetary gear carrier (30) and at a first one of the two sun gears (28), are numerically equal but in opposite directions, and a rotational speed, at a second of the two sun gears (26), is one of comparatively lower and comparatively higher.

3. The transmission device according to claim 1, wherein at least one set of the radially inner and the radially outer planetary gears (32*a*, 32*b*) is stepped with a different number of teeth.

4. The transmission device according to claim 3, wherein the radially inner planetary gears (32*a*, 32*b*) that mesh with the two sun gears (26, 28) are stepped, with a different number of teeth, and a driving connection to a fixed ring gear (36) is formed by planetary gears (34) which mesh with only one step of the radially inner planetary gears (32*a*, 32*b*).

5. The transmission device according to claim 1, wherein at least the radially inner planetary gears (32) are unstepped, and the different number of teeth of the two sun gears (26, 28) are produced by profile displacements in the teeth.

6. A transmission device incorporated into a drive axle (10) of a motor vehicle, the transmission device comprising:
at least two drive output shafts;
at least two multi-shaft planetary gearsets in active connection with one another such that a shaft of at least one of the two multi-shaft planetary gearsets being actively connectable with at least one of the two drive output shafts;
a shifting device, by which a shift is carried out between a first power path and a second power path, being provided between the two drive output shafts such that,
when the first power path is engaged, torque from an electric machine being transmitted in equal parts and with a same rotational direction to the two drive output shafts, and
when the second power path is engaged, the torque from the electric machine being transmitted with in opposite rotational directions to the two drive output shafts;
one of the two multi-shaft planetary gearsets (12, 14) is a four-shaft, reduced coupling transmission (12) with two sun gears (26, 28) arranged axially adjacent one another, a common planetary gear carrier (30) with radially inner and radially outer planetary gears (32, 34) that mesh with one another, and which are engaged with the two sun gears (26, 28) which have a different number of teeth, and with a non-rotationally arranged annular gear (36); and
the drive axle (10) being driven by an electric machine (18) and which, by the shifting device (16), is either shifted into a drive mode as the first power path or a torque-vectoring mode as the second power path.

7. The transmission device according to claim 1, wherein when the second power path is engaged, the torque supplied by the electric machine is transmitted in substantially equal portions to each of the two drive output shafts.

8. The transmission device according to claim 7, wherein when the second power path is engaged, the torque supplied by the electric machine is transmitted in substantially equal portions to each of the two drive output shafts.

* * * * *